Aug. 23, 1966 M. RICHARDS 3,268,232
SHAFT SEAL ASSEMBLIES
Filed April 25, 1963 2 Sheets-Sheet 2
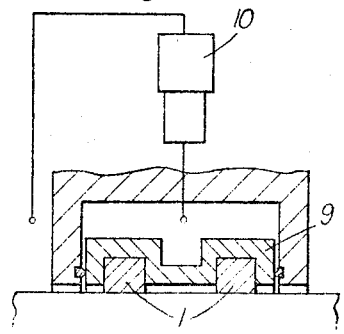
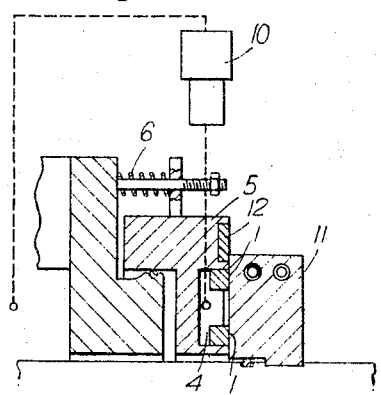
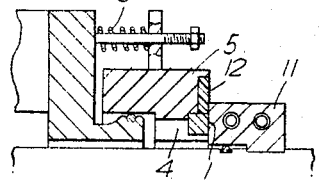
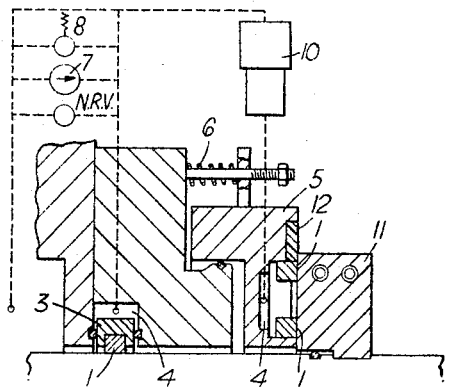

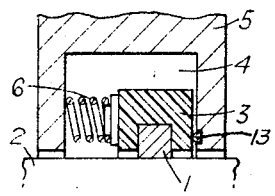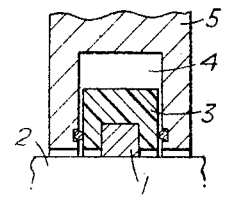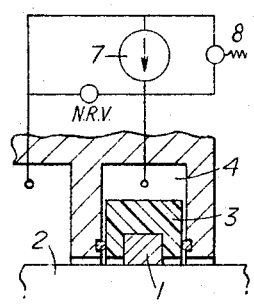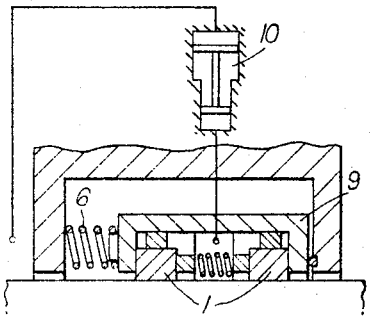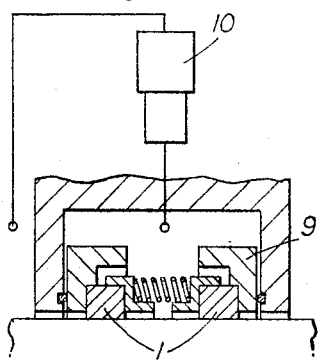

United States Patent Office 3,268,232
Patented August 23, 1966

3,268,232
SHAFT SEAL ASSEMBLIES
Michael Richards, Chalfont St. Giles, England, assignor to National Research Development Corporation, London, England, a corporation of Great Britain
Filed Apr. 25, 1963, Ser. No. 275,768
Claims priority, application Great Britain, Apr. 25, 1962, 15,700/62
4 Claims. (Cl. 277—27)

The present invention relates to a seal for a movable shaft and the like and is particularly concerned with a seal whereby the leakage of a fluid along the surface of the shaft may be controlled.

Established types of seals for shafts all suffer from various shortcomings of which the following is a summary. The stuffing-box and gland functions satisfactorily only where there is negligible radial movement of the shaft and requires frequent adjustment to control leakage. Moreover the removal of old turns of packing and their replacement with new packing and the subsequent adjustment of the gland is not a particularly simple matter. The so called mechanical seal, i.e. a face-type seal in which two flat hard surfaces are in contact, depends upon the maintenance of good sealing surfaces. In the event of failure of the seal, due to the roughening of these surfaces, a considerable amount of work is generally required in order to renew the seal since, generally, it has to be entered over the end of the shaft which is being sealed. The flexible elastomeric seal, generally known as the lip seal or oil seal, is limited in application. It requires a very good shaft finish and clean oil as the sealed fluid and suffers from the same difficulties as the mechanical seal when renewal is necessary. When the fluid sealed is a gas a labyrinth packing is sometimes used. The latter allows considerable leakage to take place and is unable to cope with considerable radial shaft movements. The carbon ring seal is also used for such purposes, but this suffers from the drawback that there is no compensation for wear so that leakage increases as wear progresses.

In the present invention a compressible sealing member consisting of a soft packing is used, the soft packing contacting the shaft and being held in an open cage structure, or in a jacket of material having a low modulus of elasticity, such as a plastic, whereby pressure may be applied, either directly to the outer and non-sealing faces of the packing or through the jacket thereto, to vary the contact pressure between the soft packing and the shaft and control the leakage of fluid along the surface thereof.

According to the present invention a seal for controlling the leakage of a fluid along a surface of a shaft or like movable member comprises a compressible sealing member engageable with the surface together with means for applying fluid pressure to the sealing member to vary the contact pressure between the sealing member and the surface.

In order that the present invention may be more fully understood reference will now be made, by way of example, to the accompanying drawings illustrating a variety of seals in accordance with the present invention, in which:

FIG. 1 is a part vertical section through a plastic jacketed seal;

FIG. 2 is a part vertical section through a chambered plastic jacketed seal;

FIG. 3 is the seal shown in FIG. 2 adapted for emergency operation;

FIG. 4 is a part vertical section through an open cage seal;

FIG. 5 is a part vertical section through a chambered open cage seal;

FIG. 6 is a modification to the seal shown in FIG. 5;

FIG. 7 is a part vertical section through an open cage face seal;

FIG. 8 is a part vertical section through a modified open cage face seal;

FIG. 9 is a part vertical section through a combination of a seal as shown in FIG. 3 together with a seal as shown in FIG. 7.

In the figures like parts are designated by the same reference numerals throughout, the sealed fluid being at the left of the figure in each case. FIG. 1 shows a simple plastic jacketed seal comprising a ring of soft packing 1 encircling the shaft 2 and held by an annular plastic jacket 3 contained in a chamber 4 in the casing 5. The plastic jacket 3 and the packing 1 are prevented from rotating with the shaft by means not shown, the plastic jacket being supported by a spring 6 to allow radial float thereof. A sealing member 13 is interposed between the jacket 3 and the casing 5 to prevent leakage therebetween from the chamber. The fluid to be sealed is able to enter the chamber 4 wherein the pressure of the fluid is applied to the plastic jacket which deforms to squeeze the packing more tightly about the shaft thereby restricting leakage of the fluid along the surface of the shaft. In FIG. 2 the chamber 4 is constricted to closely embrace the plastic jacket 3 and fluid under pressure is supplied from a source to the chamber. This source may be the sealed fluid, in which case automatic regulation of leakage along the surface of the shaft is obtained as in the case of the seal shown in FIG. 1, or the source may be a pressure supply under manual control, in which case leakage can be regulated as desired. FIG. 3 is an illustration of a seal as shown in FIG. 2 adapted for emergency or stand-by operation that can be brought into operation in the event of failure of a second seal placed downstream. The chamber 4 is normally at the same pressure as the sealed fluid and is made oversize to the shaft so that the packing 1 is ordinarily ineffective as a seal. The seal is activated by starting the pump 7 which increases the pressure in the chamber 4 to an extent decided by the relief valve 8. This results in the jacket and packing being squeezed in towards the shaft to seal the same.

In FIG. 4 two rings of soft packing 1 are used held by an annular open cage spring loaded structure 9. Grease is supplied under pressure from an hydraulic intensifier 10 to the open cage structure 9, which it penetrates to squeeze the soft packings more tightly about the shaft. The grease also serves as a buffer to prevent abrasives in the sealed fluid from entering the seal and assists in lubrication of the seal. The open cage structure 9 is supported by a spring 6 to allow radial float thereof. In FIG. 5 the chamber 4 is constricted to closely embrace the open cage structure 9 which has been modified to form a pair of cages for the soft packings, a part of each cage forming a bearing surface against the shaft to relieve the soft packings of radial floating forces to a certain extent. In FIG. 6 the open cage structure 9 has been further modified, the spring loading being dispensed with and the two cages being joined by a waist which forms a grease-lubricated bearing against the shaft to promote ease of radial float. In FIG. 7 is shown a seal of the kind illustrated in FIG. 6 adapted to seal the face of a collar 11 carried on the shaft, the collar 11 being split to facilitate replacement of the packings, etc. The soft packings are backed-up by a plastic pad 12 carried by the floating casing 5 which will engage with the collar face when the soft packings wear, without damaging the collar face and continuing to provide back-up to the soft packings. In this arrangement the casing 5 is adapted for axial float against the compression of spring 6. The pressure of grease supplied from the hydraulic intensifier 10 squeezes the soft packings against the collar face. In FIG. 8, which is also a face seal, a single ring of soft packing is used and the packing is squeezed against the collar face by the pressure of the sealed fluid entering the chamber 4. This arrangement enables a simple open cage structure for the soft packing to be machined directly in the casing 5. FIG. 9 illustrates a combination of a seal of the kind illustrated in FIG. 3 together with a seal of the kind illustrated in FIG. 7, the first seal serving as an emergency or stand-by seal for use in the event of failure of the face seal or to facilitate renewal thereof without taking the shaft out of operation.

The previously described seals are only examples of the various types of seal that may be constructed in accordance with the present invention, the preferred type of seal depending upon the particular application for which the seal is required. Considerable experimental running has been successfully conducted on all types of seal illustrated, in some cases for many hundreds of hours and at pressures up to 600 p.s.i. at speeds of 1,000 ft. per minute shaft surface speed, with water as the sealed fluid.

I claim:

1. A shaft seal assembly comprising: a stationary shaft housing; a rotatable shaft passing through said housing; a rotationally stationary member of soft packing material arranged around said shaft and sealingly contacting the peripheral surface thereof; a jacket of material having a low modulus of elasticity embracing the sides and the outer surface of said member, said jacket being disposed in said housing for radial movement relative to said shaft and being stationary relative to the rotation of said shaft; at least one sealing member between said jacket and said housing; and means for supplying fluid pressure to the outer peripheral surface of said jacket to urge said member sealingly against said shaft.

2. A shaft seal assembly according to claim 1 wherein said jacket has a groove-like opening in the inner surface thereof, said member being partially disposed in said opening.

3. A shaft seal assembly according to claim 2 wherein said sealing member is located between one transverse face of said jacket and the corresponding transverse face of said housing, and further comprising spring means located between the other transverse face of said jacket and the opposite wall of said housing for urging said jacket into sealing contact with said sealing member and said housing.

4. A shaft seal assembly according to claim 3 wherein said spring is located on the side of said jacket toward the sealed fluid which is to be prevented from leaking down the shaft, whereby the pressure of the sealed fluid will tend to urge said soft sealing material into sealing contact with said shaft, and will tend to urge said jacket in the direction of said shaft against said sealing member.

References Cited by the Examiner

UNITED STATES PATENTS

| | | | |
|---|---|---|---|
| 194,696 | 8/1877 | Loftus | 277—69 |
| 2,853,020 | 9/1958 | Hollinger et al. | 277—62 X |
| 2,871,072 | 1/1959 | Parks et al. | 277—3 X |

LAVERNE D. GEIGER, *Primary Examiner.*

SAMUEL B. ROTHBERG, *Examiner.*

L. RANEY, J. MEDNICK, *Assistant Examiners.*